Nov. 12, 1963     M. C. DINU     3,110,454
RECEPTACLE FOR STORING ELECTRIC CORDS
Filed May 4, 1962
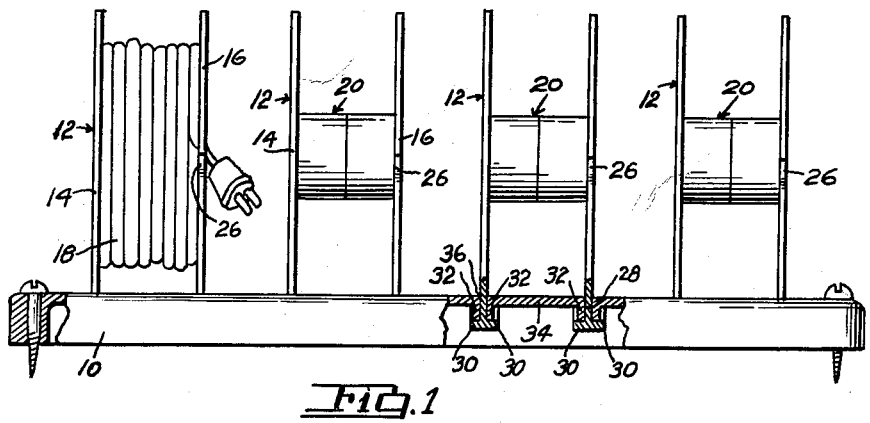
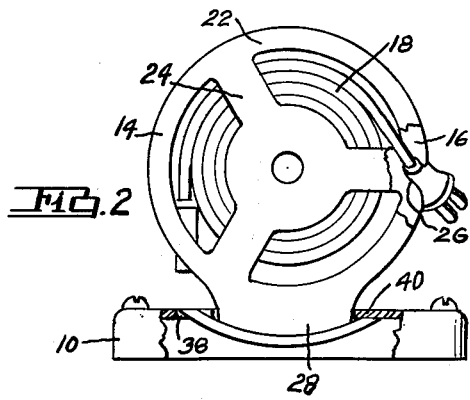
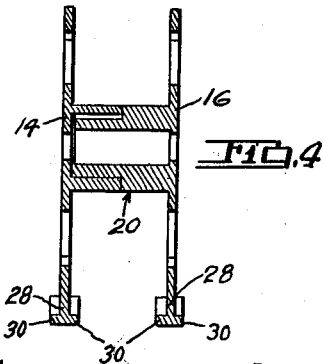
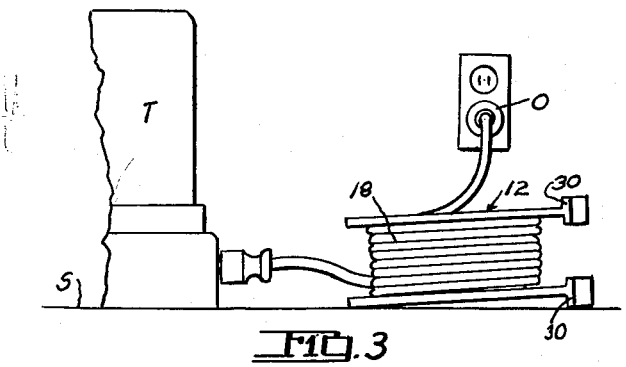
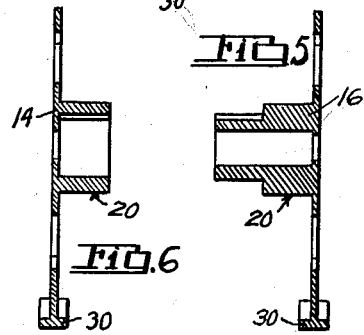
INVENTOR.
MADELINE C. DINU
BY
ATTORNEY

United States Patent Office 3,110,454
Patented Nov. 12, 1963

3,110,454
RECEPTACLE FOR STORING ELECTRIC CORDS
Madeline C. Dinu, Town House Apts., 1511 1st St., Detroit, Mich.
Filed May 4, 1962, Ser. No. 192,562
1 Claim. (Cl. 242—134)

This invention relates to a receptacle for storing electric cords for use with electrical appliances. In the use of toasters, fry pans, coffee makers, roasters, irons and the like, considerable confusion exists in the use of the proper cord for the right appliance since the plugs are of variable size. These cords are usually longer than required and present a disorderly condition when in use and become snarled, knotted and tangled when stored. Where a plurality of cords are stored in one compartment, one is usually intertwined with another which is irritating.

It is an object of the present invention to provide spools upon which the cords may be wound with the opposite terminals readily accessible, and to provide a retainer for the individual spools having a cord wound thereon.

Another object of the invention is to provide means for detachably securing the spools to the retainer so that the spools may be individually removed from the retainer with only that portion of the cord necessary for length is unwound, the unused length of the cord remaining in wound condition on the spool.

Other objects and advantages of the invention will more fully appear from the following detailed description taken in connection with the accompanying drawings in which:

FIG. 1 is a front elevational view of the spools and retainer with a cord wound around one spool and a portion of the retainer broken away illustrating the means for detachably securing the spools to the retainer;

FIG. 2 is an end elevational view of FIG. 1, parts being broken away and in section to more clearly show the construction of the device;

FIG. 3 is a view illustrating the use of the coiled cord on a spool connected to an electrical appliance and removed from the retainer;

FIG. 4 is a cross sectional view illustrating the construction of the spool;

FIG. 5 is a cross sectional view of one of the halves of the spool illustrating how it can be readily molded; and FIG. 6 is a cross sectional view of the other half of the spool illustrating that it can be formed by the same mold as the half shown in FIG. 5, but using a different core.

In the form selected for illustrating the invention there is disclosed a base or receptacle 10 in the form of an inverted pan which is generally rectangular in shape which may be molded from plastic or other material. The base 10 forms a support for a number of individual spools 12, here shown as four. The spools 12 are detachably supported by the base 10 and each spool is made in two sections 14 and 16 which may be molded. When the two halves have been united an electrical cord 18 may be wound around the hub 20 of the spool between the side discs of the spool.

Referring to FIG. 4 the two halves of a spool are shown in section and united. Each half is united and includes a radially extending disc portion which has a circular outer rim portion 22 connected to the hollow hub section by spokes 24, but the disc may be solid. At one place in the circumference of the rim portion there is a notch 26 for receiving the cord 18. At another place in the circumference of the rim portion 22 there is a radially extending flange portion 28 which is a projection of the rim portion 22. The outer edge of the flange portion 28 is arcuate and is provided with laterally extending side flanges 30 on the opposite sides of the flange portion 28 which have arcuate upper and lower faces.

The base 10 is provided with a plurality of transverse ribs 32 and projecting downwardly from the top plate 34 of the base 10. These ribs 32 have an under surface corresponding in shape to the arcuate upper surface of the side flanges 30. A transverse slot 36 in the top plate 34 is formed between each pair of transverse ribs 32 to receive the radially extending flange portion 28. This slot 36 is of a length slightly longer than the width of the radially extending flange portion 28 and is of a width at one end 38 to receive the flanges 30.

When a spool is to be supported on the base 10 the end of the flanges 30 are inserted into the wider portion 38 of the slot 36. The spool is then given a combined rotary and sliding movement with the flange 30 sliding on the outer faces of the ribs 32. The ends of the flanges 30 are resisted by further movement by the closed portion 40 of the top plate 34.

The flanges 30 of the portion 28 are properly aligned by a key 42 molded in the hub section 16 mating with a groove 44 molded in the hub section 14. When the hub sections are assembled the key 42 fits in the groove 44 to properly align the flanges 28.

When it is desired to use a certain electrical appliance, one of the spools is selected having the proper cord thereon to fit the appliance, both ends of the cord are partially unwound from the spool, one end being plugged into the outlet plug and the other end being plugged into the appliance. The spool can then be laid on its side with a portion of the cord remaining on the spool out of the way and free from a tangled mess.

As shown in FIG. 3 a toaster T for example may rest on a support S and the spool 12 may be removed from the base 10 and placed adjacent the toaster with one portion of the cord 18 attached to the toaster, the opposite end attached to an outlet plug O on the wall, and the remainder of the cord remaining on the spool 12. When the toaster is not in use the cord ends are wound on the spool and the spool returned to the base 10 which may be located in a convenient drawer, placed in a location close to the outlet plug, or attached to the wall.

It will be understood that there is provided a device which retains a plurality of cords for individual use without one cord becoming tangled with another when not in use.

The invention has been illustrated and described in connection with a specific device, but various changes may be made in the size, shape and arrangement of parts without departing from the spirit of the invention and it is my intention to cover by the appended claim such changes as may be reasonably included within a fair interpretation of the meaning of the terms therein.

I claim:

A receptacle for a plurality of electrical cords, a base portion having a plurality of slots through its upper surface, a plurality of spools having a hub portion and radially extending side portions, laterally flanged projections extending beyond the outer periphery of said side portions for reception in said slotted base portion, and electrical cords wound around the hub of said spool with both free ends thereof accessible.

References Cited in the file of this patent

UNITED STATES PATENTS

| 1,186,131 | Replogle | June 6, 1916 |
| 2,449,464 | Eypper | July 20, 1943 |
| 3,021,093 | Halpern | Feb. 13, 1962 |

FOREIGN PATENTS

| 252,259 | Great Britain | May 25, 1926 |